United States Patent
Rose et al.

(10) Patent No.: US 12,110,033 B2
(45) Date of Patent: Oct. 8, 2024

(54) METHODS AND SYSTEMS TO OPTIMIZE VEHICLE EVENT PROCESSES

(71) Applicant: GM GLOBAL TECHNOLOGY OPERATIONS LLC, Detroit, MI (US)

(72) Inventors: Andrew P Rose, Glen Allen, VA (US); Donald K Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 524 days.

(21) Appl. No.: 17/444,013

(22) Filed: Jul. 29, 2021

(65) Prior Publication Data

US 2023/0035340 A1    Feb. 2, 2023

(51) Int. Cl.
| | |
|---|---|
| B60W 50/02 | (2012.01) |
| B60W 40/08 | (2012.01) |
| G06F 16/9035 | (2019.01) |
| G06N 20/00 | (2019.01) |
| G06Q 40/08 | (2012.01) |

(52) U.S. Cl.
CPC ........ *B60W 50/0205* (2013.01); *B60W 40/08* (2013.01); *G06F 16/9035* (2019.01); *G06N 20/00* (2019.01); *G06Q 40/08* (2013.01); *B60W 2050/021* (2013.01); *B60W 2050/0215* (2013.01); *B60W 2540/221* (2020.02)

(58) Field of Classification Search
CPC ............ B60W 50/0205; B60W 40/08; B60W 2050/021; B60W 2050/0215; B60W 2540/221; G06F 16/9035; G06N 20/00; G06Q 40/08; G07C 5/008; G08G 1/164; G08G 1/167; G08G 1/0112; G08G 1/0129; G08G 1/0133; G08G 1/0141; G08G 1/0145; G08G 1/205
See application file for complete search history.

(56) References Cited

U.S. PATENT DOCUMENTS

| | | | |
|---|---|---|---|
| 11,162,800 B1 * | 11/2021 | Carbery | G01C 21/28 |
| 2019/0210548 A1 * | 7/2019 | Levy | H04M 1/72418 |
| 2023/0360004 A1 * | 11/2023 | Zhou | G07C 5/006 |

* cited by examiner

*Primary Examiner* — Russell Frejd
*Assistant Examiner* — Ana D Thomas
(74) *Attorney, Agent, or Firm* — Lorenz & Kopf LLP

(57) ABSTRACT

In various embodiments, methods and systems are provided for processing data pertaining to a vehicle event for a vehicle. In accordance with an exemplary embodiment, vehicle sensor data is obtained from one or more vehicle sensors pertaining to the vehicle event. Also in an exemplary embodiment, an assessment of the vehicle event is determined via a processor, including as to a fault or a severity, or both associated with the vehicle event, based on the vehicle sensor data.

20 Claims, 4 Drawing Sheets

METHODS AND SYSTEMS TO OPTIMIZE VEHICLE EVENT PROCESSES

TECHNICAL FIELD

The technical field generally relates to vehicles, and more particularly relates to methods and systems for optimizing processes with respect to a vehicle event.

Today, when a vehicle event occurs, various processes may be implemented, such as assessing vehicle damage, occupant injuries, insurance claims, and the like. However, such existing techniques may not always provide optimal processing, for example in terms of time required.

Accordingly, it may be desirable to provide improved methods and systems for processing with respect to a vehicle event, such as assessing vehicle damage, occupant needs, and insurance claims.

SUMMARY

In accordance with an exemplary embodiment, a method is provided for processing data pertaining to a vehicle event for a vehicle, which includes: obtaining vehicle sensor data from one or more vehicle sensors pertaining to the vehicle event; and determining, via a processor, an assessment of the vehicle event, including a fault or a severity, or both associated with the vehicle event, based on the vehicle sensor data.

Also in an exemplary embodiment, the method further includes obtaining, from a computer memory, a database of prior vehicle events; wherein the step of determining the assessment of the vehicle event includes determining the assessment of the vehicle event based on the vehicle sensor data in combination with the database of prior vehicle events.

Also in an exemplary embodiment, the method further includes generating the database of prior vehicle events, via one or more computer processors, via machine learning.

Also in an exemplary embodiment, the method further includes taking a vehicle control action, based on the assessment of the vehicle event, via instructions provided by the processor.

Also in an exemplary embodiment, the step of obtaining the vehicle sensor data includes obtaining the vehicle sensor data from the one or more vehicle sensors that are built into the vehicle; and the step of determining the assessment includes determining, via the processor, the assessment using the vehicle sensor data from the one or more vehicle sensors that are built into the vehicle.

Also in an exemplary embodiment, the method further includes notifying, via instructions provided by the processor, an insurance provider of the vehicle event along with the assessment of the vehicle event.

Also in an exemplary embodiment, the step of obtaining the vehicle sensor data includes: obtaining first sensor data from the one or more vehicle sensors before the vehicle event; obtaining second sensor data from the one or more vehicle sensors during the vehicle event; and obtaining third sensor data from the one or more vehicle sensors after the vehicle event; and the step of determining the assessment of the vehicle event includes determining, via the processor, the assessment of the vehicle event using each of the first sensor data, second sensor data, and third sensor data.

Also in an exemplary embodiment, the step of determining the assessment of the vehicle event includes determining, via the processor, a cause of fault of the vehicle event, based on the vehicle sensor data.

Also in an exemplary embodiment, the step of obtaining the vehicle sensor data includes obtaining at least some of the vehicle sensor data before the vehicle event; and the step of determining the cause of fault of the vehicle event is made by the processor based on a driving behavior of a driver of the vehicle, based on the at least some of the vehicle sensor data obtained prior to the vehicle event.

Also in an exemplary embodiment, the step of determining the assessment of the vehicle event includes determining, via the processor, the assessment of damage to the vehicle, based on the vehicle sensor data.

Also in an exemplary embodiment, the step of obtaining the vehicle sensor data includes obtaining at least some of the vehicle sensor data during the vehicle event; and the step of determining the assessment of damage to the vehicle is made by the processor based on an impact to the vehicle, including a severity and a location of the impact, based on the at least some of the vehicle sensor data obtained during the vehicle event.

Also in an exemplary embodiment, the step of determining the assessment of the vehicle event includes determining, via the processor, an assessment of injury to one or more passengers of the vehicle, based on the vehicle sensor data.

Also in an exemplary embodiment, the step of obtaining the vehicle sensor data includes obtaining at least some of the vehicle sensor data during the vehicle event; and the step of determining the assessment of injury is made by the processor based on an impact to the vehicle, including a severity and a location of the impact, based on the at least some of the vehicle sensor data obtained during the vehicle event.

In another exemplary embodiment, a system is provided for processing data pertaining to a vehicle event for a vehicle, the system including one or more vehicle sensors and a processor. The one or more vehicle sensors are configured to generate vehicle sensor data pertaining to the vehicle event. The processor is coupled to the one or more vehicle sensors, and is configured to at least facilitate determining an assessment of the vehicle event, including a fault or a severity, or both associated with the vehicle event, based on the vehicle sensor data.

Also in an exemplary embodiment, the processor is further configured to at least facilitate: obtaining, from a computer memory, a database of prior vehicle events generated via machine learning; and determining the assessment of the vehicle event based on the vehicle sensor data in combination with the database of prior vehicle events.

Also in an exemplary embodiment, the processor is further configured to at least facilitate taking a vehicle control action, based on the assessment of the vehicle event, via instructions provided by the processor.

Also in an exemplary embodiment, the processor is further configured to at least facilitate notifying, via instructions provided by the processor, an insurance provider of the vehicle event along with the assessment of the vehicle event.

Also in an exemplary embodiment, the one or more vehicle sensors are configured to generate: first sensor data before the vehicle event; second sensor data during the vehicle event; and third sensor data after the vehicle event; and the processor is configured to at least facilitate determining the assessment of the vehicle event using each of the first sensor data, second sensor data, and third sensor data.

Also in an exemplary embodiment, the processor is configured to at least facilitate determining a cause of fault, a damage to the vehicle, and an injury to one or more passengers of the vehicle from the vehicle event, based on each of the first sensor data, second sensor data, and third sensor data.

In another exemplary embodiment, a vehicle is provided that includes a body, one or more vehicle sensors, and a processors. The one or more vehicle sensors are built into the body and configured to generate vehicle sensor data pertaining to a vehicle event. The processor is coupled to the one or more vehicle sensors, and is configured to at least facilitate: determining an assessment of the vehicle event, including a fault or a severity, or both associated with the vehicle event, based on the vehicle sensor data; and automatically taking a vehicle control action, based on the assessment of the vehicle event.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
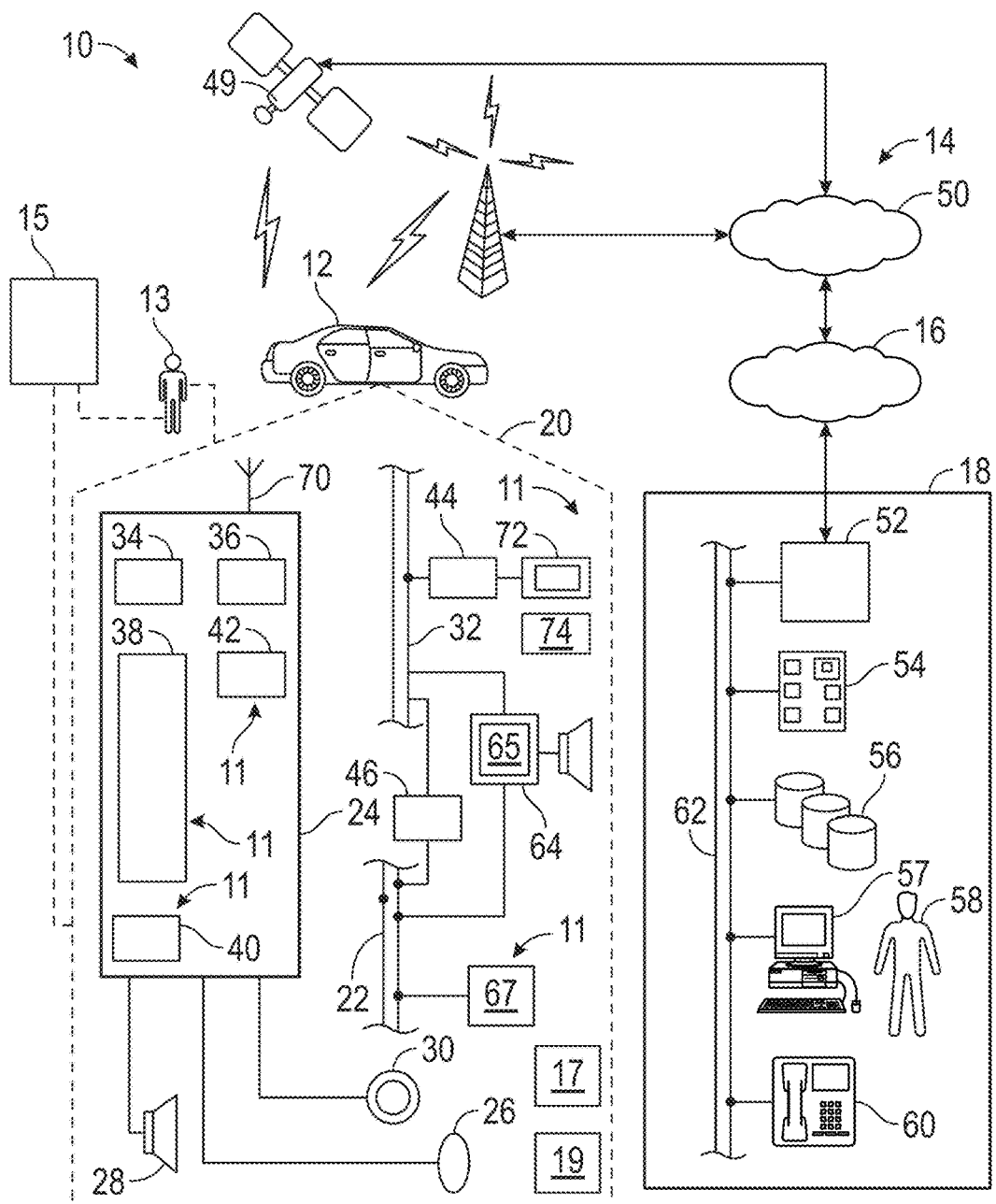
FIG. 1 is a functional block diagram of a communications system that includes a vehicle having a control system that is configured to provide processing with respect to vehicle events, such as vehicle damage, occupant needs, and insurance claims, in accordance with an exemplary embodiment.

FIG. 1 is a functional block diagram of a communications system 10, in accordance with an exemplary embodiment. As described in greater detail further below, the communications system 10 includes a vehicle 12 (also referred to herein as the "host vehicle") that includes a control system 11 that is configured to provide processing with respect to vehicle events, such as vehicle damage, occupant needs, and insurance claims, in accordance with an exemplary embodiment. As described further below, in various embodiments, the control system 11 includes a processor 38, a computer memory 40, sensors 72, and one or more transceiver 74 and display components 67. In certain embodiments, the control system may also include a satellite-based location determining system component (e.g., GPS) 42, among various other components.

In various embodiments, the vehicle 12 comprises an internal combustion vehicle, an electric vehicle, or a hybrid electric vehicle, and is operated using a motor 17 (e.g., an internal combustion engine, electric motor, and/or other motors). In certain embodiments, the vehicle 12 may also include one or more rechargeable energy storage systems (RESS), among other components.

As depicted in FIG. 1, in certain embodiments, the user 13 also has a device 15, such as a smart phone, computer, and/or other electronic device 15, for example that may communicate with both the user 13 and the vehicle 12.

As depicted in FIG. 1, the communications system 10 generally includes the vehicle 12, along with one or more wireless carrier systems 14, one or more land networks 16, and one or more remote servers 18. It should be appreciated that the overall architecture, setup, and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as an automobile, motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including detecting when a vehicle event occurs (including processing with respect to vehicle damage, occupant injuries and/or needs, insurance claims, and/or other processing) when a vehicle event occurs. In various embodiments, a vehicle "event" includes, but is not limited to, an occurrence in which the vehicle 12 contacts or is contacted by another vehicle or object, and/or any other occurrence in which the vehicle 12 may suffer damage, one or more occupants may suffer an injury and/or require attention, and/or one or more insurance claims may be needed. In various embodiments, the telematics unit 24 provides processing with respect to assessments, determinations, and predictions with respect to vehicle repair needs, occupant needs, and insurance claims pertaining to the vehicle event, in accordance with the process 300 of FIG. 3 and the implementations of FIGS. 2 and 4, as described in greater further below in accordance with exemplary embodiments.

In addition, in certain embodiments, the telematics unit 24 may also provide connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the driver 13 of the vehicle 12. In various embodiments, the display components 67 provides a visual display for the driver 13 as to various driver alerts, warnings, and/or notifications, among other information. For example, in certain embodiments, the display component 67 may comprise one or more visual display systems such as a visual display screen for a navigation system of the vehicle, a head up display (HUD) and/or other visual display and/or visual projection, such as on a windshield of the vehicle 12, and so on. In certain embodiments, such information may also be provided via an audio system, such as the audio component 64.

Vehicle sensors 72, connected to various sensor interface modules 44 are operatively connected to the vehicle bus 32. In various embodiments, the vehicle sensors 72 are built into the vehicle 12. Also, in various embodiments, the vehicle sensors 72 are coupled to the processor 38 and provide sensor information thereto.

In various embodiments, the vehicle sensors 72 include a variety of sensors for use in processing with respect to vehicle events, for use by the processor 38 in the process 300 of FIG. 3 and the implementations of FIGS. 2 and 4, for example as described in greater detail further below. In various embodiments, the sensors 72 include, among other possible sensors, one or more cameras, Lidar sensors, radar sensors, impact sensors, speed sensors, accelerometers, weight or mass sensors, tire sensors, biometric sensors voltage sensors, and input sensors.

In various embodiments, the one or more cameras are utilized in obtaining camera sensor data for monitoring a driver of the vehicle 12 as well as obtaining information as to an environment surrounding the vehicle 12 and any visual indications of and/or information pertaining to a vehicle event. Also, in various embodiments, one or more other Lidar sensors, radar sensors, and/or other range sensors are also utilized for obtaining sensor data that includes information as to an environment surrounding the vehicle 12 and any visual indications of and/or information pertaining to a vehicle event. In addition, in certain embodiment, similar cameras, Lidar sensors, radar sensors, and/or other range sensors of other vehicles (e.g., in proximity to the vehicle) are also utilized in generating such sensor data. In certain embodiments, these sensors (e.g., cameras, Lidar sensors, radar sensors, and/or other range sensors from the vehicle 12 and/or one or more other vehicles in proximity thereto) generate data from before the vehicle event up until the vehicle event (and in certain embodiments also during and/or after the vehicle event).

In addition, in various embodiments, the one or more impact sensors are configured detect a vehicle event. Also, in various embodiments, the one or more speed sensors (e.g., one or more wheel speed sensors) are configured to detect a speed or velocity of the vehicle and/or information used to calculate the speed or velocity. Also, in certain embodiments, the one or more accelerometers are configured to detect an acceleration of the vehicle 12, including deceleration thereof during a vehicle event. In addition, in various embodiments, one or more weight or mass sensors are configured to detect information pertaining to a vehicle event, such as a seating position of occupants of the vehicle 12. Also, in various embodiments, the tire sensors are configured to detect tire pressure and/or other data pertaining to tires of the vehicle, including pressure change during a vehicle event. In certain embodiments, these sensors (e.g., the speed sensors, accelerometers, weight or mass sensors, and/or tire sensors of the vehicle 12) generate data during the vehicle event.

Also, in various embodiments, the biometric sensors obtain biometric sensor data regarding a health or condition of occupants in the vehicle 12, including voice detection, breathing, heart rate, and the like. In addition, in various embodiments, the voltage sensors are configured to measure voltage and changes in voltage, including for a vehicle rechargeable energy storage system (RESS), engine control unit (ECU), and/or other vehicle systems and components, including following a vehicle event. Also, in various embodiments, the input sensors are configured to receive user inputs from one or more occupants of the vehicle 12 (e.g., on a touch screen in response to a vehicle notification, and so on). In certain embodiments, these sensors (e.g., the biometric sensors, voltage sensors, and input sensors) generate data after the vehicle event.

In addition, in various embodiments, the vehicle sensors 72 may also include any number of additional sensors including, by way of example, gyroscopes, magnetometers, emission detection, and/or control sensors, and the like. Also, in various embodiments, exemplary sensor interface modules 44 include powertrain control, climate control, and body control, to name but a few.

In various embodiments, the processor 38 controls the vehicle 12, including the processing with respect to vehicle events. Also in various embodiments, the vehicle sensors 72 obtain sensor data from the sensors 72 as well as additional data (e.g., from one or more other vehicles, systems, and/or entities), and utilizes this data in making determinations and taking appropriate actions with respect to vehicle events, as set forth in greater detail in connection with the process 300 of FIG. 3 and the implementations of FIGS. 2 and 4 in accordance with exemplary embodiments.

In various embodiments, the one or more transceivers 74 are configured to send and receive messages between the vehicle 12 and the remote server 18 and/or one or more other entities (e.g., information providers, repair shops, emergency service providers, insurance providers, and the like), for example using the wireless systems 14.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, processors (and/or computers) 57, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile, or fixed.

Figure 2:
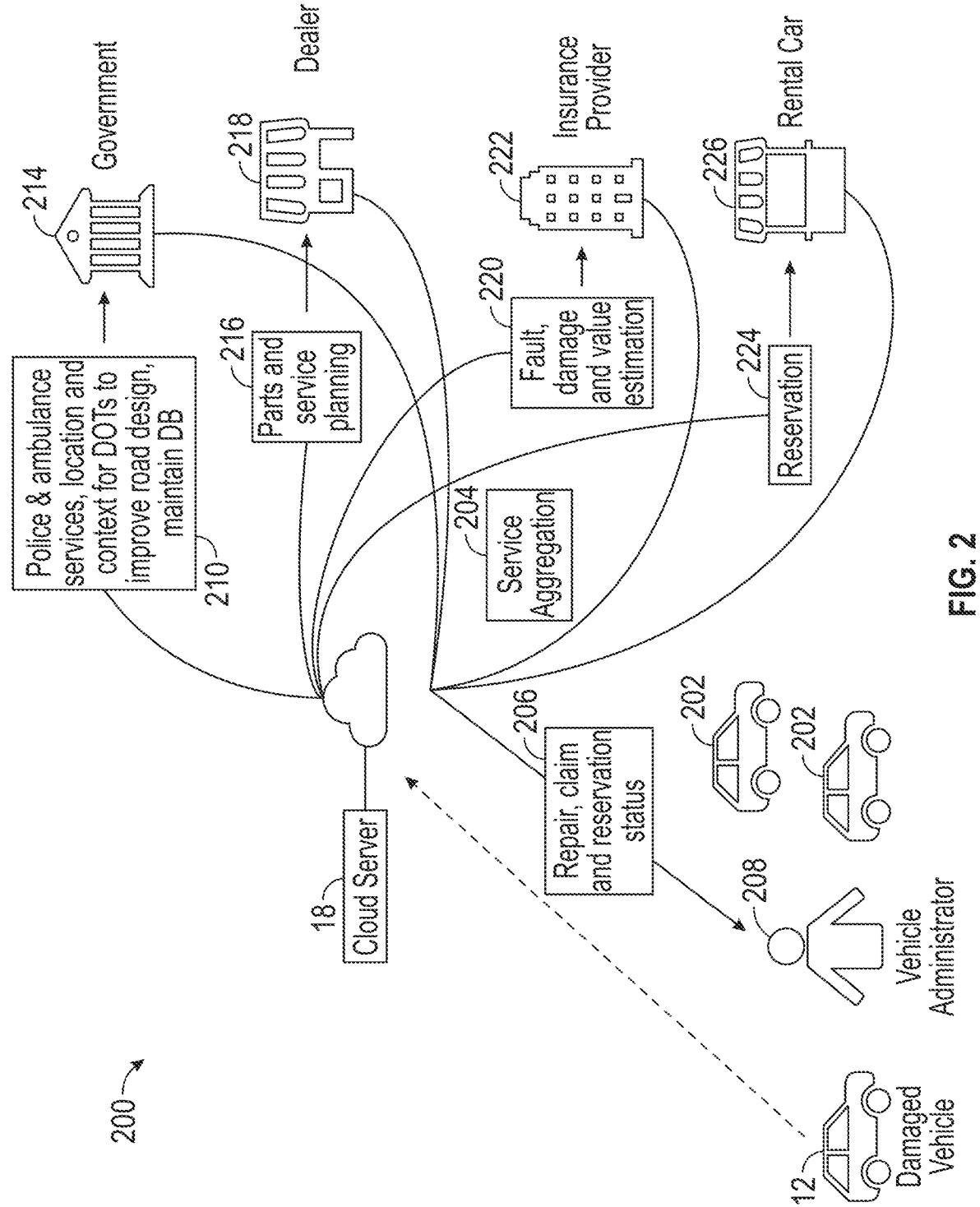
FIG. 2 is a flow diagram illustrating an implementation of the control system and communications system of FIG. 1, in accordance with an exemplary embodiment.

FIG. 2 is a flow diagram illustrating a flow 200 representing an implementation of the control system 11 and communications system 10 of FIG. 1, in accordance with an exemplary embodiment. With reference to FIG. 2, in an exemplary embodiments, vehicle sensor data as to the vehicle event involving the vehicle 12 is obtained from vehicle sensors (including sensors that are built into the vehicle), including from the vehicle 12 and one or more other vehicles 202 in proximity thereto. In various embodiments, the data and/or determinations pertaining thereto are provided to the remote server 18, which performs service aggregation 204 pertaining to the vehicle event.

With continued reference to FIG. 2, in various embodiments, one or more processors 57 of the remote server and/or processors 38 of the vehicle 12 make the determinations regarding the vehicle event, and provide for actions including the service aggregation 204 of various services relating thereto, in accordance with the process 300 described further below in connection with FIG. 3, as well as the implementations depicted in FIG. 2 and FIG. 4.

As depicted in FIG. 2, in various embodiments, the service aggregation 204 includes administrative information 206 for a vehicle administrator 208. In various embodiments, the administrative information 206 includes repair, claim, and reservation status (e.g., as to reservation of a vehicle repair appointment and/or rental car) for the vehicle administrator.

Also as depicted in FIG. 2, in various embodiments, the service aggregation 204 also includes governmental and/or emergency information 210 for one or more governmental and/or emergency entities 214. In various embodiments, the government and/or emergency information 210 includes information for police services and/or ambulance services, as well as information as to a location and context of the vehicle event for such emergency services. In addition, in various embodiments the location and context of the vehicle event is also provided for departments of transportation and/or other governmental and/or similar entities for improving road design, maintain one or more vehicle event databases, and so on.

Also as depicted in FIG. 2, in various embodiments, the service aggregation 204 also includes vehicle repair information 216 for one or more repair entities 214. In various embodiments, the vehicle repair information 216 includes information as to damage that is likely to have been suffered by the vehicle 12 due to the vehicle event, along with required repairs and/or replacement parts relating thereto. Also, in various embodiments, such information is provided to one or more automotive details, service stations, body shops, and/or other repair entities 214 for parts and service planning, for example to facilitate streamlined and more rapid and efficient repairs, and so on.

Also as depicted in FIG. 2, in various embodiments, the service aggregation 204 also includes claim related information 220 for one or more insurance providers 222. In various embodiments, the claim information 220 includes information as to fault, damage, and value estimations for use by the insurance providers 222 in assessing faults and for settling and paying claims pertaining to the vehicle event.

Also as depicted in FIG. 2, in various embodiments, the service aggregation 204 also includes rental car information 224 for one or more rental car providers 226. In various embodiments, the rental car information 224 includes information as to rental car requirements, preferences, and/or reservations for or pertaining to an owner or user or user of the vehicle 12, relating to the vehicle event (e.g., a rental car for use while the vehicle 12 is being repaired, or the like).

As noted above, in various embodiments, the flow 200 of FIG. 2 is implemented in connection with the process 300 of FIG. 3, described below.

Figure 3:
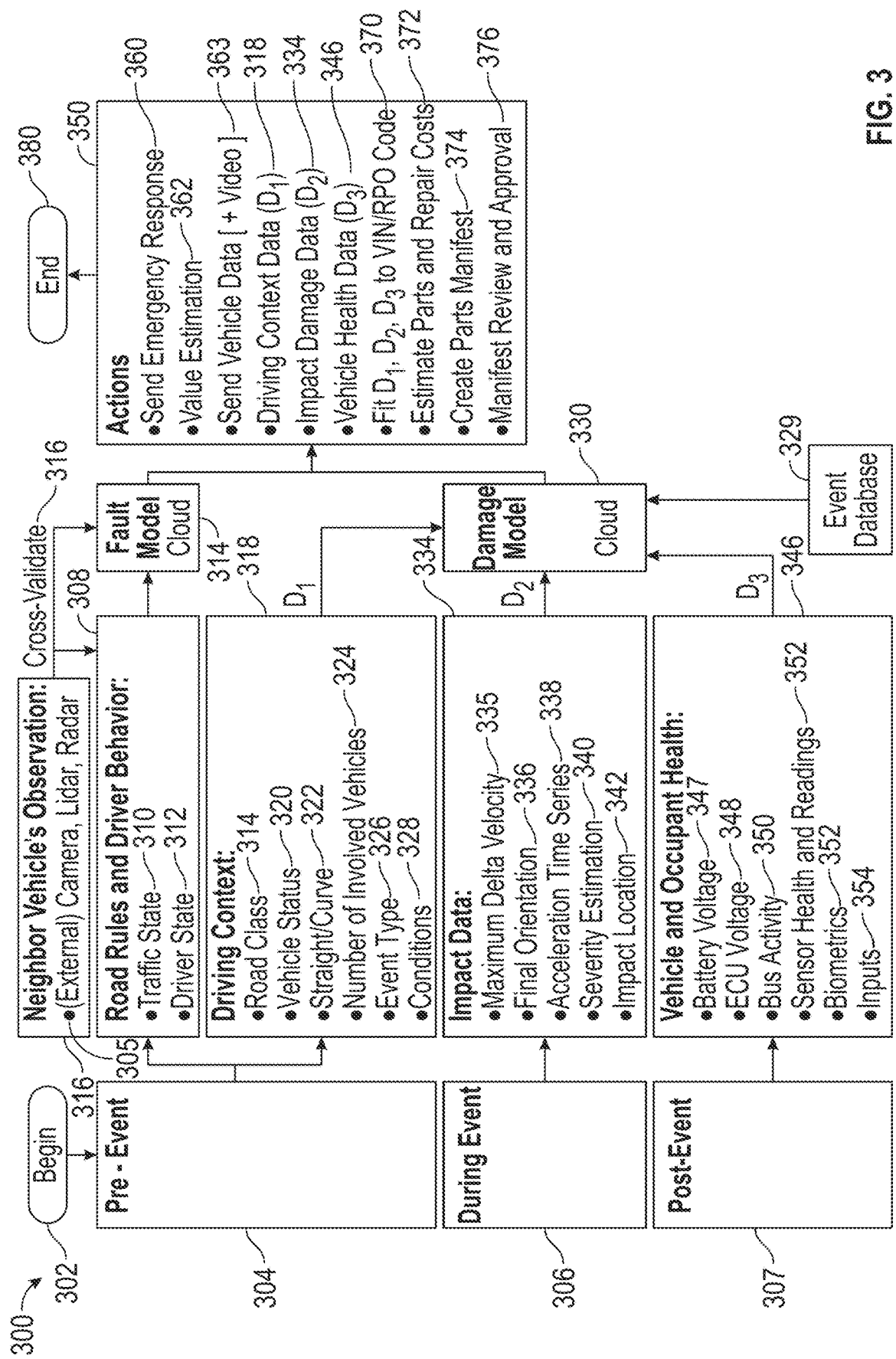
FIG. 3 is a flowchart of a method for processing with respect to vehicle events, such as vehicle damage, occupant needs, and insurance claims, and that can be implemented in connection with the control system and communications system of FIG. 1, in accordance with an exemplary embodiment.

FIG. 3 is a flowchart of a method or process 300 for processing with respect to vehicle events, such as vehicle damage, occupant needs, and insurance claims, in accordance with an exemplary embodiments. In various embodiments, the process 300 can be implemented in connection with the control system 11 and communications system 10 of FIG. 1, as well as in connection with the flow 200 described above and also in connection with the implementation of FIG. 4 described further below.

As depicted in FIG. 3, in various embodiments the process 300 begins at step 302. In certain embodiments, the process 300 begins when the control system 11 of FIG. 1 is activated. For example, in certain embodiments, the process 300 begins when one or more users of the vehicle 12 (e.g., a driver) approaches or enters the vehicle 12, or turns on the vehicle 12 and/or an ignition therefor (e.g. by turning a key, engaging a keyfob or start button, and so on), and/or when a vehicle drive begins or is initiated. In certain embodiments, the steps of the process 300 are performed continuously while the control system 11 is activated.

In various embodiments, pre-event data is obtained (steps 304 and 305). In various embodiments, the pre-event data is obtained via various vehicle sensors 72 of FIG. 1 of the vehicle 12 of FIG. 1 (step 304) (e.g., that are built into the vehicle 12), and in certain embodiments also from one or more other vehicles in proximity thereto (e.g., vehicles 202 of FIG. 2) (step 305), before the vehicle event. In certain embodiments the pre-event data of steps 304 and 305 include sensor data from one or more cameras, Lidar, radar, and/or other data from the vehicle 12 (step 304) and other vehicles 202 in proximity thereto (step 305), for example as described above with respect to FIG. 1. In various embodiments, the pre-event data of steps 304 and 305 pertain to a location and operation of the vehicle 12, along with conditions of an environment and roadway of which the vehicle 12 is being operated, before and up until the vehicle event.

Also, in various embodiments, event data is also obtained during the vehicle event (step 306). In various embodiments, the event data of step 306 includes data from various vehicle sensors 72 of the vehicle 12 (e.g., that are built into the vehicle 12). For example, in certain embodiments, the event data of step 306 includes sensor data from one or more impact sensors, speed sensors, accelerometers, weight or mass sensors, and tire sensors of the vehicle 12 during the vehicle event, for example as described above in connection with FIG. 1. In various embodiments, the event data of step 306 comprises data relating to the vehicle event, including a status and needs of the vehicle 12 and occupants thereof, including an impact to the vehicle 12, the speed, velocity, and acceleration of the vehicle 12 and changes thereto, seating positions of the occupants of the vehicle 12, tire pressure changes, and so on. In certain embodiments, this data is provided to the remote server 108 via the transceiver 74 in accordance with instructions provided by the processor 38.

Also, in various embodiments, post event data is also obtained during the vehicle event (step 307). In various embodiments, the post event data of step 308 includes data from various vehicle sensors 72 of the vehicle 12 (e.g., that are built into the vehicle 12). For example, in certain embodiments, the post event data of step 307 includes sensor data from one or more biometric sensors, voltage sensors, and input sensors of the vehicle 12 after the vehicle event, for example as described above in connection with FIG. 1. In various embodiments, the post event data of step 307 comprises data relating to effects of the vehicle event, including a health or condition of occupants in the vehicle 12

(e.g., including voice detection, breathing, heart rate, and the like) as well as voltages and voltage changes of the vehicle rechargeable energy storage system (RESS), engine control unit (ECU), and/or other vehicle systems and components following the vehicle event. In certain embodiments, this data is provided to the remote server 108 via the transceiver 74 in accordance with instructions provided by the processor 38.

In various embodiments, determinations are made as to road rules and driver behavior (step 308). In various embodiments, these determinations are made by the processors 38 and/or 57 of FIG. 1 (e.g., from the vehicle 12 and/or the remote server 108 of FIG. 1) based on the pre-event sensor obtained at steps 304 and 305. In various embodiments, during step 308, determinations are made as to a traffic state 310 and a driver/operating state 312. In various embodiments, the determinations as to the traffic state 310 include determinations as to traffic signal states, any stop/yield signs, any speed limits, and so on. Also in various embodiments, determinations as to the driver/operating state 312 include determinations as to a state of the driver (including attentiveness thereof), any driver responses (such as braking, steering, or the like, a lane following status (e.g., as to whether the vehicle 12 is remaining within and/or following its lane of the roadway in which it is being driven), a turn signal status for the vehicle 12, and so on. In certain embodiments, this data is provided to the remote server 108 via the transceiver 74 in accordance with instructions provided by the processor 38.

In certain embodiments, the road rules and driver behavior are provided to a fault model (step 314). In various embodiments, during step 314, the processor 57 of the remote server 108 of FIG. 1 determines one or more measures of fault for the vehicle event and/or information pertaining thereto. Also, in various embodiments, cross-validation is also provided at step 316 with respect to the road rules and driver behavior of step 308, based on the pre-event data from the other vehicles from step 305. For example, in certain embodiments, the fault model of step 314 may include driver behavior such as whether the driver was attentive, whether the driver followed speed limits, traffic laws, stop or yield signs, traffic signals (e.g., traffic lights), and so on. In certain embodiments, the processor 38 of the vehicle 12 of FIG. 1 may also perform one or more determinations of steps 314 and/or 316.

Also, in various embodiments, determinations are made as to driving context (step 318). In various embodiments, these determinations are made by the processors 38 and/or 57 of FIG. 1 (e.g., from the vehicle 12 and/or the remote server 108 of FIG. 1) based on the pre-event sensor obtained at step 304. In various embodiments, during step 318, determinations are made as to a road class 319, vehicle status 320, straight/curvature status 322 of the roadway, number of vehicles 324, event type 326, and conditions 328. In various embodiments, the road class 319 includes the type of road, such as highway versus non-highway, paved versus unpaved, number of lanes, and so on. Also, in various embodiments, vehicle status 320 includes a vehicle speed, vehicle mass (including mass at different passenger seats of the vehicle), tire pressure, and so on. Also, in various embodiments, the straight/curvature status 322 pertains to an amount and/or degree of curvature in the roadway on which the vehicle 12 is travelling. Also, in various embodiments, the number of vehicles 324 pertains to the number of vehicles involved in the vehicle event. In addition, in various embodiments, the event type 326 pertains to the type of vehicle event. In certain embodiments, this data is provided to the remote server 108 via the transceiver 74 in accordance with instructions provided by the processor 38.

In various embodiments, the driving context determinations (and data pertaining thereto) of step 318 is referred to as "D1" in FIG. 3. Also, in various embodiments, the driving context determinations and data pertaining thereto (i.e., D1) are provided to a damage model 330, described in greater further below. In certain embodiments, this data is provided to the remote server 108 via the transceiver 74 in accordance with instructions provided by the processor 38.

Also, in various embodiments, determinations are made as to impact data (step 334). In various embodiments, these determinations are made by the processors 38 and/or 57 of FIG. 1 (e.g., from the vehicle 12 and/or the remote server 108 of FIG. 1) based on the event sensor obtained at step 306. In various embodiments, during step 334, determinations are made as to a maximum delta velocity 335, a final orientation 336, an acceleration time series 338, a severity estimation 340, and an impact location 342. Also, in various embodiments, maximum delta velocity 335 is determined as the largest change in velocity for the vehicle 12 during or as a result of the vehicle event. Also, in various embodiments, the final orientation 336 is determined as the final orientation (including direction in which the vehicle 12 is facing) following the vehicle event. Also, in various embodiments, the acceleration time series 338 pertains to acceleration changes for the vehicle 12 as a result of the vehicle event. Also in various embodiments, severity estimation 340 pertains to the severity of the vehicle event, for example in terms of amount of impact and/or likely damage as a result of the vehicle event (e.g., as may be determined based on whether airbags, such as driver passenger, left, right, and/or curtain, were deployed or nearly deployed, and/or whether pretensioner deployment occurred, for example for seat belts, and/or whether a vehicle rollover occurred, and so on). Also, in various embodiments, the impact location 342 pertains to one or more specific locations on the vehicle 12 in which the impact occurred (e.g., front, rear, and/or side). In certain embodiments, this data is provided to the remote server 108 via the transceiver 74 in accordance with instructions provided by the processor 38.

In various embodiments, the impact data of step 334 is referred to as "D2" in FIG. 3. Also, in various embodiments, the impact data (i.e., D2) is provided to the damage model 330, described in greater further below. In certain embodiments, this data is provided to the remote server 108 via the transceiver 74 in accordance with instructions provided by the processor 38.

Also, in various embodiments, determinations are made as to vehicle and occupant health (step 346). In various embodiments, these determinations are made by the processors 38 and/or 57 of FIG. 1 (e.g., from the vehicle 12 and/or the remote server 108 of FIG. 1) based on the post-event sensor obtained at step 307. In various embodiments, during step 346, determinations are made as to battery voltage 347, ECU voltage 348, bus activity 350, sensor health and readings 352, biometrics 352, and user inputs 354. Also, in various embodiments, the battery voltage 347 pertains to a voltage (or change thereof) of an energy storage system (e.g., battery) of the vehicle 12 following the vehicle event. Also, in various embodiments, the ECU voltage 348 pertains to a voltage (or change thereof) of an engine control unit (ECU) of the vehicle 12 following the vehicle event. Also, in various embodiments, the bus activity 350 pertains to communication bus activity (e.g., including CAN/LIN/ETH buses, and including short and impedance data) following the vehicle event. Also, in various embodiments, the sensor health and readings 352 pertains to sensor data values and health of the sensors 72 of FIG. 1 (e.g., sensor failures, and so on) of the vehicle 12 following the vehicle event. Also, in various embodiments, the biometrics 352 relates to biometrics data (e.g., breathing, heart rate, and the like) of occupants of the vehicle 12, and/or other interior health sensing (e.g., VOC) following the vehicle event. Also, in various embodiments, user inputs 354 include any inputs provided by a driver or other user of the vehicle 12 (e.g., pressing an emergency button, initiating an emergency call, and so on). In certain embodiments, this data is provided to the remote server 108 via the transceiver 74 in accordance with instructions provided by the processor 38.

In various embodiments, the vehicle and occupant health data of step 346 is referred to as "D3" in FIG. 3. Also, in various embodiments, the vehicle and occupant health data (i.e., D3) is provided to the damage model 330, described in greater further below. In certain embodiments, this data is provided to the remote server 108 via the transceiver 74 in accordance with instructions provided by the processor 38.

Also, in various embodiments, a vehicle event database is obtained (step 329). In various embodiments, the vehicle event database is stored in a computer memory (e.g., of the remote server 108 of FIG. 1), and includes data based on prior vehicle events including the vehicle 12 and/or various other vehicles. In various embodiments, different data (e.g., including pre-event data, event data, and post-event data) from the various prior vehicle events of the vehicle 12 and/or of any number of other vehicles is generated using machine learning techniques for use in analyzing vehicle events, including for use in the damage model of step 330.

In various embodiments, during step 330, one or more damage models are utilized to determine estimated amounts of damage and/or harm to the vehicle 12, other vehicles, and/or passengers as a result of the vehicle event. In various embodiments, during step 330, the processor of the remote server 108 of FIG. 1 determines estimated amounts of damage and/or harm to the vehicle 12, other vehicles, and/or passengers as a result of the vehicle event, based on the driving context of step 318 (i.e., D1), the impact data of step 334 (i.e., D2), the vehicle and occupant health data of step 346 (i.e., D3), and data from the vehicle event database of step 329. For example, in certain embodiments, the damage model of step 330 takes into account the nature and severity of impact, where on the vehicle 12 that impact was concentrated (e.g., for vehicle damage purposes as well as for determining which passengers may have injuries, and so on), various sensor readings from sensors 72 that are built into the vehicle 12, and so on. In certain embodiments, the processor 38 of the vehicle 12 of FIG. 1 may also perform one or more determinations of step 330.

In various embodiments, various vehicle actions are taken (step 359). Specifically, in various embodiments, during step 359, the 57 of the remote server 108 of FIG. 1 performs various vehicle actions based on the fault model of step 314 and the damage model of step 330. In certain embodiments, the processor 38 of the vehicle 12 of FIG. 1 may also perform one or more of the actions of step 359. In certain embodiments, the actions of step 359 include one or more vehicle control actions and/or other actions for processing and/or assistance with respect to the vehicle event.

As illustrated in FIG. 3, the actions of step 359 may include one or more emergency response calls 360. In various embodiments, these may include one or more of the following, among others: (i) notification of one or more first responders such as police; (ii) notification of one or more other first responders, such as medical personnel, ambulances, and/or firefighters or the like; (iii) notification of other legal authorities; (iv) notification of towing providers; (v) notification of one or more vehicle dealers, service stations, repair shops, or the like; (vi) prioritization of repairs; (vii) establishing a single point of contact for the owner of the vehicle 12; (viii) requesting a replacement and/or rental vehicle, and so on.

Also, in various embodiments, the actions of step 359 may also include providing one or more value estimations 362. For example, in certain embodiments, estimations of value may be based upon vehicle suspension (e.g., roughness), powertrain (e.g., revolutions per minute and/or accelerator pedal engagement), and an environment surrounding the vehicle 12 (e.g., weather conditions), and so on. For example, in certain embodiments, suspension wear ($S_w$) is determined using an International Roughness Index (IRI) with trace data to estimate suspension wear due to traveling on rough roads. Also, in certain embodiments, powertrain wear ($P_w$) is determined using changes in revolutions per minute (i.e., delta rpm) along with engine torque, pedal data, and the like to determine vehicle usage and wear to powertrain and braking systems. Also, in certain embodiments, environment wear ($E_w$) is determined using wiper and humidity data to estimate vehicle operating environment. In addition, in certain embodiments, these variables are utilized to construct a wear factor ("f") that can be applied to the "top condition" price, in accordance with the following equations:

$$f = w_1 S_w + w_2 P_w + w_3 E_w \quad \text{(Equation 1), and}$$

$$\text{Vehicle Value} = \$\_top\_condition * f \quad \text{(Equation 2)}.$$

Also, in certain embodiments, if the vehicle damage (including parts+labor) is greater than the value of the vehicle, then the vehicle is declared to be a total loss.

In certain embodiments, the value estimations 362 may be provided to the owner of the vehicle 12, and/or to governmental and/or legal authorities, insurance companies, and so on.

Also, in various embodiments, the actions of step 359 may also include sending vehicle data and video 363. In certain embodiments, the vehicle data and video may be provided to the owner of the vehicle 12, and/or to governmental and/or legal authorities, insurance companies, and so on.

Also, in various embodiments, the actions of step 359 may also include sending the driving context data of step 318 (i.e., D1). In certain embodiments, the driving context data may be provided to the owner of the vehicle 12, and/or to governmental and/or legal authorities, insurance companies, and so on.

Also, in various embodiments, the actions of step 359 may also include sending the impact data of step 334 (i.e., D2). In certain embodiments, the impact data may be provided to the owner of the vehicle 12, and/or to governmental and/or legal authorities, insurance companies, and so on.

Also, in various embodiments, the actions of step 359 may also include sending the vehicle health data of step 346 (i.e., D3). In certain embodiments, the vehicle health data may be provided to the owner of the vehicle 12, and/or to governmental and/or legal authorities, insurance companies, and so on.

Also, in various embodiments, the actions of step 359 may also include providing one or more estimates of parts and repair costs 372 for the vehicle as a result of the vehicle event. In certain embodiments, the estimates of the parts and repair costs may be provided to the owner of the vehicle 12, and/or to governmental and/or legal authorities, insurance companies, and so on.

Also, in various embodiments, the actions of step 359 may also include providing a parts manifest 374 for the vehicle as a result of the vehicle event. In certain embodiments, the parts manifest may be provided to the owner of the vehicle 12, and/or to governmental and/or legal authorities, insurance companies, and so on.

Also, in various embodiments, the actions of step 359 may also include review and approval 376 of the parts manifest. In certain embodiments, the review and approval is provided by the insurance company or other paying party, and is then transmitted to the owner, repair shop, and/or other entity for making the repairs, and so on.

In various embodiments, the process then terminates at step 380.

Figure 4:
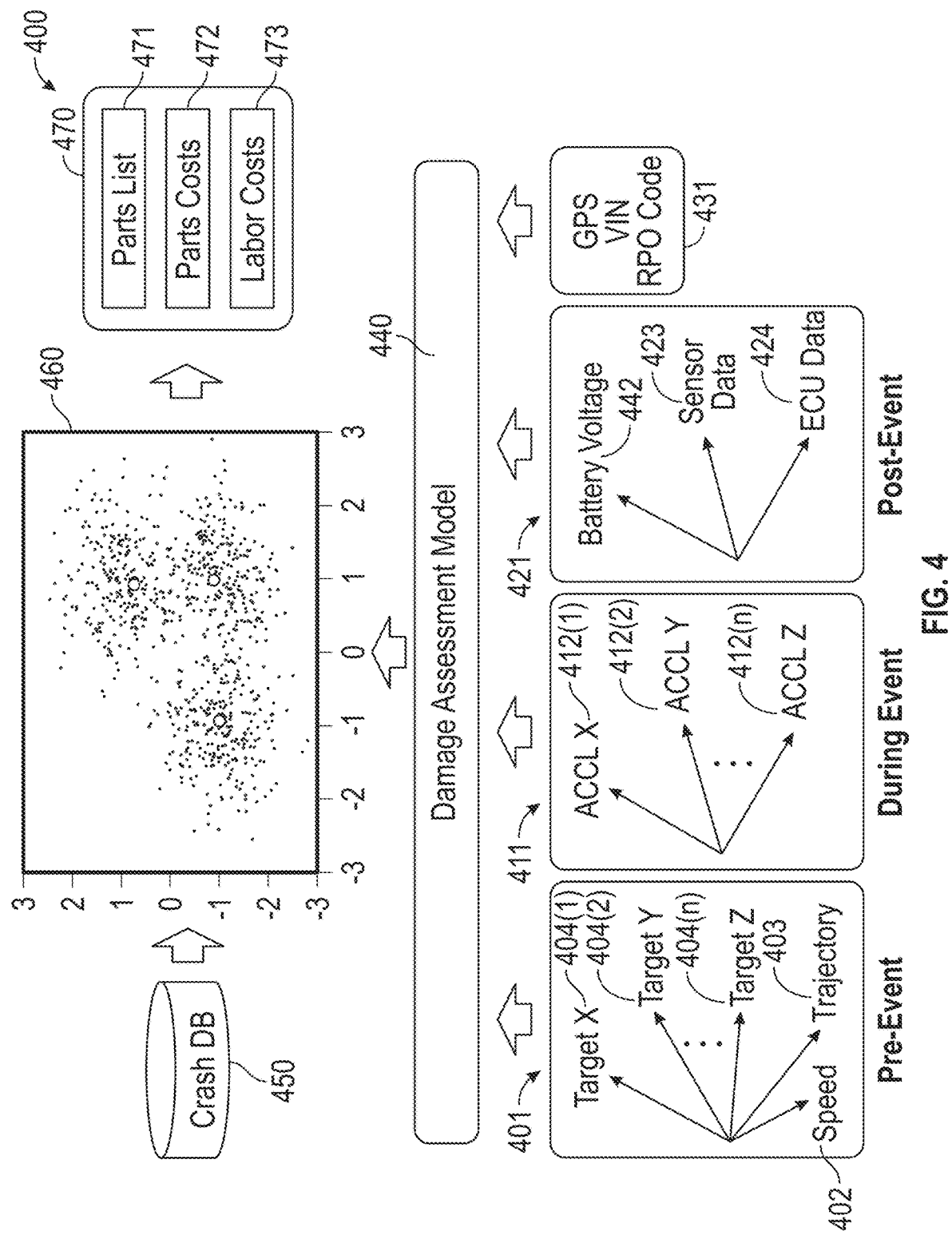
FIG. 4 is a logical block diagram illustrating an implementation of the method of FIG. 3, and that can be implemented in connection with the control system and communications system of FIG. 1 in accordance with an exemplary embodiment.

FIG. 4 is a logical block diagram illustrating an implementation of the process 300 of FIG. 3, in accordance with an exemplary embodiment, and that can be implemented in connection with the control system 11 and communications system 10 of FIG. 1 in accordance with an exemplary embodiment.

As depicted in FIG. 4, pre-event data 401 (e.g., corresponding to steps 304 and 305 of FIG. 3) is utilized to determine a speed 402 and trajectory 403 of the vehicle 12, as well as data with respect to one or more targets 404(1), 404(2), . . . 404(n), such as other vehicles and/or objects in proximity to the vehicle 12. Also as depicted in FIG. 4, event data 411 (e.g., corresponding to step 306 of FIG. 3) is utilized to determine acceleration values 412(1), 412(2), . . . 412(n) at different points in time during the vehicle event. Also as depicted in FIG. 4, post-event data 421 (e.g., corresponding to step 307 of FIG. 3) is utilized to determine battery voltage values 442, vehicle sensor data 423 (e.g., biometric data, sensor health and readings data, user inputs, and so on), and ECU voltage data 424 following the vehicle event. Also as depicted in FIG. 4, additional data 431 (e.g., global position system, [GPS] data, other location data, vehicle identification data (e.g., VIN), other identifiers [e.g., RPO code] and the like may also be determined). In various embodiments, the various data from 401-431 above are provided to a damage assessment model 440 (i.e., corresponding to the damage model of step 330 of FIG. 3).

Also as depicted in FIG. 4, in various embodiments, an event database 450 is utilized. In various embodiments the event database 450 corresponds to the event database of step 329 and is generated based on prior vehicle events (e.g., using the vehicle 12 and/or other vehicles) using machine learning.

In various embodiments, probability models 460 are generated using both the damage assessment model 440 and the event database 450. In various embodiments, the probability models 460 include one or more probability frequency diagrams and/or other probability plots, functions, tables, other models, or the like assessing various probabilities to different possible outcomes for the vehicle as a result of the vehicle event (such as requirements for repair or replacement of parts, associated costs, and so on).

Also, in various embodiments, the probability models 460 are used to generate repair estimates 470 for the vehicle. In various embodiments, the repair estimates 470 include a parts list 471 for parts requiring repair or replacement, parts costs 472 associated therewith, and labor costs 473 associated therewith.

Accordingly, in various embodiments, methods and systems are provided for processing pertaining to vehicle events. In various embodiments, various types of vehicle sensor data are utilized to generate analysis with respect to a vehicle event, including fault assessments, damage assessments to the vehicle, assessments of injuries to occupants, and so on. In various embodiments, various vehicle actions may be taken using these assessments, including summoning of medical personnel, arranging of vehicle repairs and rental cars, providing of relevant information to governmental and legal authorities and insurance companies, and so on.

It will be appreciated that the systems and methods may vary from those depicted in the Figures and described herein. For example, the communications system of FIG. 1, including the vehicle thereof and the control system and other components thereof, may vary from that depicted in FIG. 1 and/or described herein, in various embodiments. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations. It will similarly be appreciated that the implementations of FIGS. 2 and 4 may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method for processing data pertaining to a vehicle event for a vehicle, the method including:
    obtaining vehicle sensor data from one or more vehicle sensors pertaining to the vehicle event;
    obtaining, from a computer memory, an event database of prior vehicle events;
    determining, via a processor, an assessment of the vehicle event, including a fault or a severity, or both associated with the vehicle event, based on the vehicle sensor data, wherein the step of determining the assessment of the vehicle event comprises:
        generating, via the processor, a damage assessment model for the vehicle resulting from the vehicle event, using the sensor data;
        generating, via the processor, a probability model, based on the damage assessment model and the event database, that assesses probabilities to different possible outcomes for the vehicle as a result of the vehicle event; and
        determining, via the processor based on the probability model, service requirements for the vehicle, including for parts and labor for repair of the vehicle, resulting from the vehicle event as determined using the probability model; and
    automatically taking a vehicle control action, via the processor based on the assessment of the vehicle event and the service requirements using the probability model.

2. The method of claim 1, further comprising:
    generating the database of prior vehicle events, via one or more computer processors, via machine learning.

3. The method of claim 1, wherein:
the step of obtaining the vehicle sensor data comprises obtaining the vehicle sensor data from the one or more vehicle sensors that are built into the vehicle; and
the step of determining the assessment comprises determining, via the processor, the assessment using the vehicle sensor data from the one or more vehicle sensors that are built into the vehicle.

4. The method of claim 1, further comprising:
notifying, via instructions provided by the processor, an insurance provider of the vehicle event along with the assessment of the vehicle event.

5. The method of claim 1, wherein:
the step of obtaining the vehicle sensor data comprises:
obtaining first sensor data from the one or more vehicle sensors before the vehicle event;
obtaining second sensor data from the one or more vehicle sensors during the vehicle event; and
obtaining third sensor data from the one or more vehicle sensors after the vehicle event; and
the step of determining the assessment of the vehicle event comprises determining, via the processor, the assessment of the vehicle event using each of the first sensor data, second sensor data, and third sensor data.

6. The method of claim 1, wherein the step of determining the assessment of the vehicle event comprises determining, via the processor, a cause of fault of the vehicle event, based on the vehicle sensor data.

7. The method of claim 6, wherein:
the step of obtaining the vehicle sensor data includes obtaining at least some of the vehicle sensor data before the vehicle event; and
the step of determining the cause of fault of the vehicle event is made by the processor based on a driving behavior of a driver of the vehicle, based on the at least some of the vehicle sensor data obtained prior to the vehicle event.

8. The method of claim 6, wherein the cause of the vehicle event is determined by the processor based on an attentiveness of a driver of the vehicle as reflected in the sensor data.

9. The method of claim 8, wherein the cause of the vehicle event is determined by the processor based also on a curvature of a roadway on which the vehicle is travelling, as reflected in the sensor data.

10. The method of claim 1, wherein the step of determining the assessment of the vehicle event comprises determining, via the processor, the assessment of damage to the vehicle, based on the vehicle sensor data, wherein the step of obtaining the vehicle sensor data includes obtaining at least some of the vehicle sensor data during the vehicle event; and the step of determining the assessment of damage to the vehicle is made by the processor based on an impact to the vehicle, including a severity and a location of the impact, based on the at least some of the vehicle sensor data obtained during the vehicle event.

11. The method of claim 1, wherein the step of determining the assessment of the vehicle event comprises determining, via the processor, an assessment of injury to one or more passengers of the vehicle, based on the vehicle sensor data.

12. The method of claim 11, wherein:
the step of obtaining the vehicle sensor data includes obtaining at least some of the vehicle sensor data during the vehicle event; and
the step of determining the assessment of injury is made by the processor based on an impact to the vehicle, including a severity and a location of the impact, based on the at least some of the vehicle sensor data obtained during the vehicle event.

13. The method of claim 1, further comprising:
determining, via the processor, an estimated cost for repairing the vehicle as a result of the vehicle event, based on the parts and labor required for the repairing of the vehicle and respective costs associated therewith.

14. The method of claim 13, further comprising:
providing, via instructions provided by the processor, to a third party, a parts manifest that includes the parts required for the repairing of the vehicle.

15. The method of claim 13, further comprising:
securing, via instructions provided by the processor, a service appointment for the repairing of the vehicle using the parts manifest.

16. The method of claim 15, further comprising:
securing, via instructions provided by the processor, a rental car for a user of the vehicle based on the service appointment.

17. The method of claim 1, wherein the probability model comprises one or more probability frequency diagrams, functions, or tables.

18. A system for processing data pertaining to a vehicle event for a vehicle, the system comprising:
one or more vehicle sensors configured to generate vehicle sensor data pertaining to the vehicle event; and
a processor that is coupled to the one or more vehicle sensors and configured to at least facilitate:
obtaining, from a computer memory, an event database of prior vehicle events generated via machine learning;
determining an assessment of the vehicle event, including a fault or a severity, or both associated with the vehicle event, based on the vehicle sensor data, including by:
generating a damage assessment model for the vehicle resulting from the vehicle event, using the sensor data;
generating a probability model, based on the damage assessment model and the event database, that assesses probabilities to different possible outcomes for the vehicle as a result of the vehicle event; and
determining, based on the probability model, service requirements for the vehicle, including for parts and labor for repair of the vehicle, resulting from the vehicle event as determined using the probability model; and
automatically taking a vehicle control action, based on the assessment of the vehicle event and the service requirements using the probability model.

19. The system of claim 18, wherein:
the one or more vehicle sensors are configured to generate:
first sensor data before the vehicle event;
second sensor data during the vehicle event; and
third sensor data after the vehicle event;
the processor is configured to at least facilitate determining the assessment of the vehicle event using each of the first sensor data, second sensor data, and third sensor data; and
the processor is configured to at least facilitate determining a cause of fault, a damage to the vehicle, and an injury to one or more passengers of the vehicle from the vehicle event, based on each of the first sensor data, second sensor data, and third sensor data.

20. A vehicle comprising:
a body;
one or more vehicle sensors that are built into the body and configured to generate vehicle sensor data pertaining to a vehicle event; and
a processor that is coupled to the one or more vehicle sensors and configured to at least facilitate:
  obtaining, from a computer memory, an event database of prior vehicle events generated via machine learning;
  determining an assessment of the vehicle event, including a fault or a severity, or both associated with the vehicle event, based on the vehicle sensor data, including by:
    generating a damage assessment model for the vehicle resulting from the vehicle event, using the sensor data;
    generating a probability model, based on the damage assessment model and the event database, that assesses probabilities to different possible outcomes for the vehicle as a result of the vehicle event; and
    determining, based on the probability model, service requirements for the vehicle, including for parts and labor for repair of the vehicle, resulting from the vehicle event as determined using the probability model; and
  automatically taking a vehicle control action, based on the assessment of the vehicle event and the service requirements using the probability model.

* * * * *